US008108020B2

(12) United States Patent
Anderson et al.

(10) Patent No.: US 8,108,020 B2

(45) Date of Patent: Jan. 31, 2012

(54) IDENTIFICATION OF AN ANTENNA

(75) Inventors: Fred Jay Anderson, Lakeville, OH (US); Stephen V. Saliga, Akron, OH (US); Thomas Goss Lutman, Cuyahoga Falls, OH (US); Paul Jeffrey Stager, Akron, OH (US); James Anthony Mass, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 12/437,962

(22) Filed: May 8, 2009

(65) Prior Publication Data

US 2010/0283585 A1 Nov. 11, 2010

(51) Int. Cl.
*H04M 1/00* (2006.01)

(52) U.S. Cl. .................. 455/575.7; 342/457; 340/572.4; 343/876

(58) Field of Classification Search ............... 455/575.7, 455/575.1, 575.5, 562.1; 342/450, 453, 457, 342/352, 357.2; 340/10.42, 572.4; 343/876, 343/742, 713, 715, 895

See application file for complete search history.

(56) References Cited

U.S. PATENT DOCUMENTS

| | | | | |
|---|---|---|---|---|
| 5,491,715 | A | 2/1996 | Flaxl | |
| 5,745,844 | A | 4/1998 | Kromer et al. | |
| 6,236,365 | B1 * | 5/2001 | LeBlanc et al. | 342/457 |
| 6,236,841 | B1 | 5/2001 | Akiya | |
| 6,687,488 | B2 | 2/2004 | Elder et al. | |
| 6,687,492 | B1 | 2/2004 | Sugar et al. | |
| 6,788,731 | B2 | 9/2004 | Kim et al. | |
| 6,823,180 | B2 | 11/2004 | Reed et al. | |
| 6,853,197 | B1 | 2/2005 | McFarland et al. | |
| 6,862,433 | B2 | 3/2005 | Callaway, Jr. | |
| 6,873,651 | B2 | 3/2005 | Tesfai et al. | |
| 6,952,181 | B2 * | 10/2005 | Karr et al. | 342/457 |
| 7,171,238 | B2 | 1/2007 | Nicholson | |
| 7,268,742 | B2 * | 9/2007 | Rahim | 343/867 |
| 7,589,647 | B2 * | 9/2009 | Homer et al. | 340/999 |
| 7,812,766 | B2 * | 10/2010 | Leblanc et al. | 342/457 |
| 7,930,010 | B2 * | 4/2011 | Johansson et al. | 455/575.7 |
| 2004/0127247 | A1 | 7/2004 | Reece et al. | |

* cited by examiner

*Primary Examiner* — Lam T Mai

(74) *Attorney, Agent, or Firm* — Brinks Hofer Gilson & Lione

(57) ABSTRACT

A system that is operable to adjust operation of a network device is provided. The system includes an identification module that is coupled with an antenna connector that couples the antenna with a network device. The identification module includes an identification characteristic that may be used to determine an antenna characteristic that defines operation of the antenna. The operation of the network device may be adjusted based on the antenna characteristic.

20 Claims, 6 Drawing Sheets

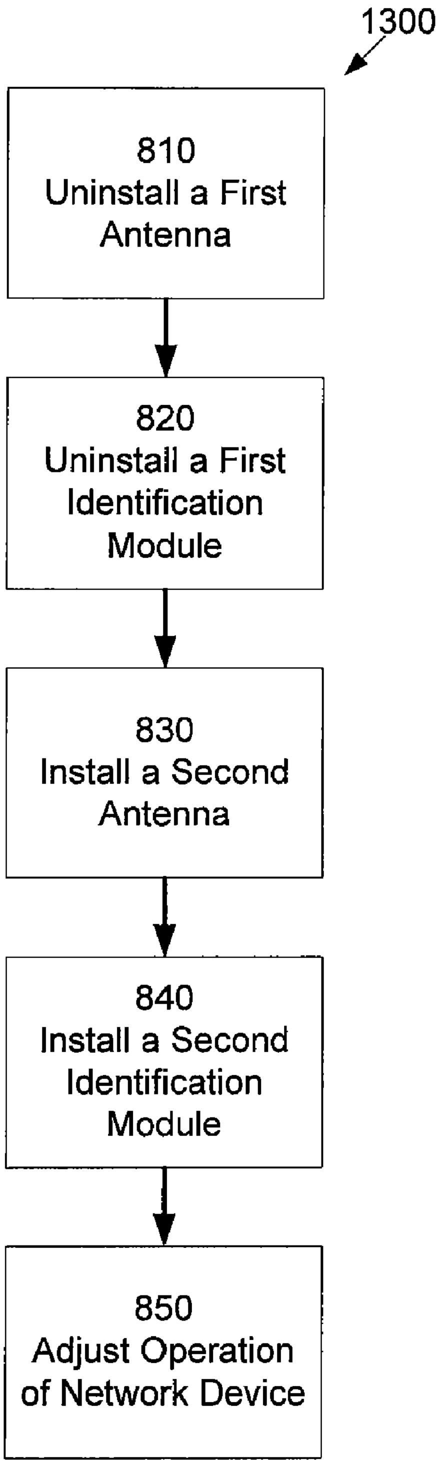
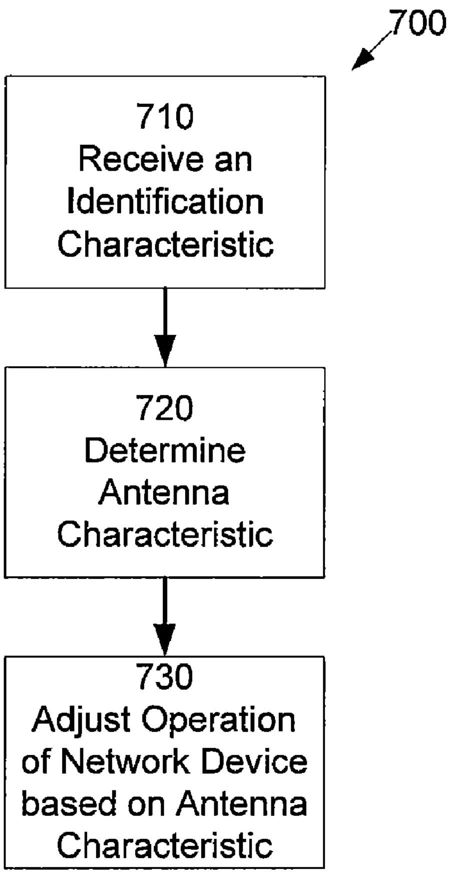
FIGURE 7
FIGURE 8

IDENTIFICATION OF AN ANTENNA

FIELD OF TECHNOLOGY

The present embodiments relate to identification of antennas. In particular, the present embodiments relate to an identification system that may identify an antenna.

BACKGROUND

A network device, such as an access point or router, may use an antenna to transmit and receive information. The operation of the antenna may be constrained to prevent usage which exceeds certain levels. For example, the Federal Communication Commission, another regulatory body, or an agency may define an approved gain value for the antenna. During operation of the antenna, the network device is prevented from raising the output power beyond a level that would cause a gain level above the approved gain value. Where different antennas are available, the gain used by the network device may be limited based on the highest gain antenna. Operating at a gain value set for the highest gain antenna restricts the functionality of a low gain antenna. This undesirable situation exists because the network device is unable to determine what antenna and, more specifically, gain value has been attached.

BRIEF DESCRIPTION OF THE DRAWINGS

FIG. 7 illustrates one embodiment of a method for adjusting operation of a network device based on an antenna characteristic; and FIG. 8 illustrates one embodiment of a method for installing an identification module and adjusting operation of a network device based on an identification characteristic stored on the identification module.

DESCRIPTION

Figure 1:
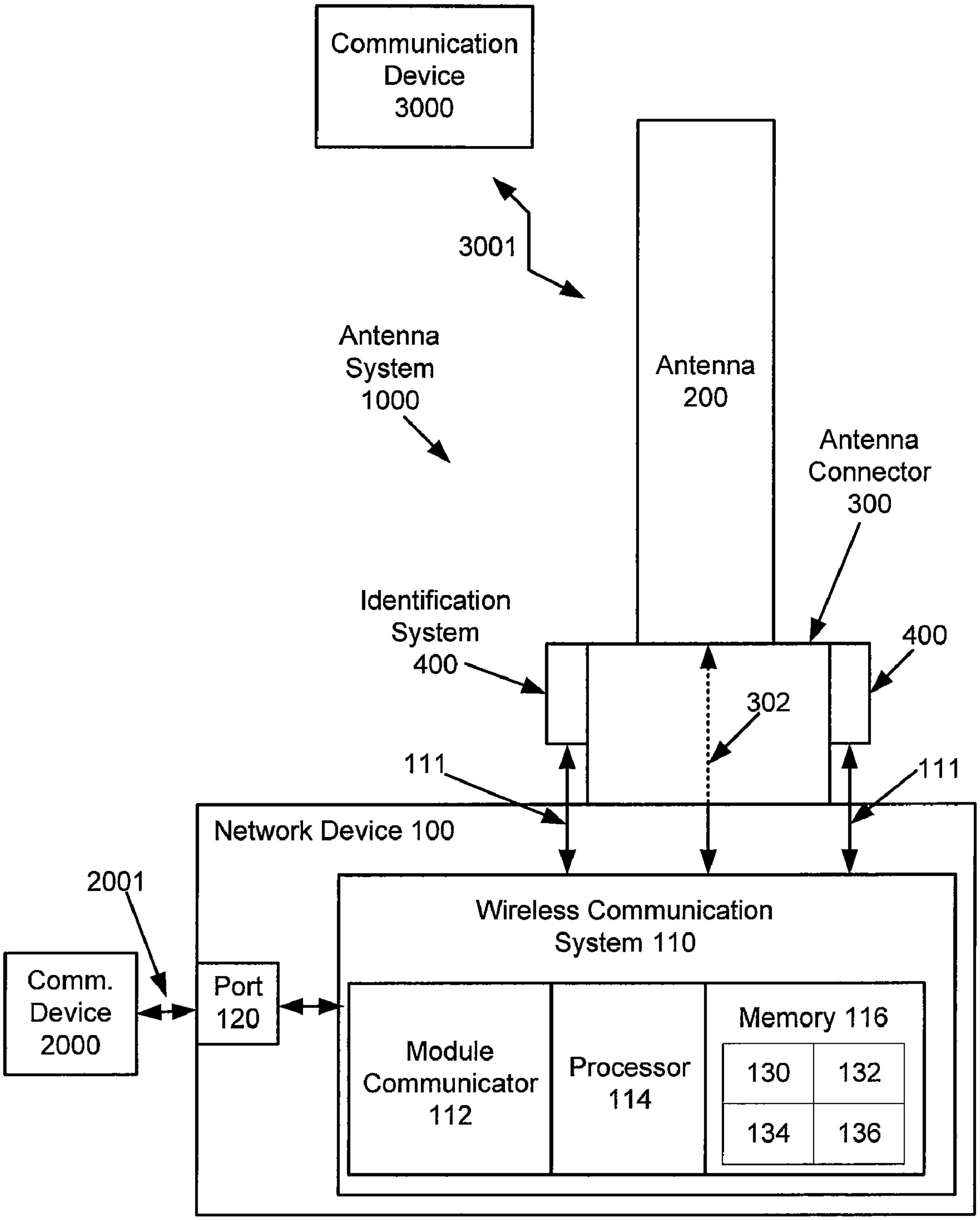
FIG. 1 illustrates one embodiment of an antenna system.

The present embodiments relate to identification of an antenna. As used herein, "identification of an antenna" may include determination of one or more antenna characteristics. The antenna characteristics may include approved gain values, authentication information, or other antenna related information. The antenna may be coupled with a network device, such as an access point or router. Operation of a network device may be adjusted based on the one or more antenna characteristics. For example, the output power of the network device may be adjusted based on an approved gain value for the antenna.

In order to determine the antenna characteristics, the network device may communicate with an identification module attached to an antenna connector. The identification system is part of the antenna connector on the network device, on the antenna, or a separate component. The antenna connector couples the antenna with the network device. The identification system may store and/or determine one or more antenna characteristics. The one or more antenna characteristics may be transferred to the network device. Alternatively, or additionally, the identification system may have one or more module characteristics, such as a resistance value or capacitance value, which are responsive to a connected antenna. The network device may obtain the one or more module characteristics and determine one or more antenna characteristics based on the one or more module characteristics. In either embodiment, the network device may determine one or more operation parameters of the network device, such as an output power value, based on the one or more antenna characteristics. The network device may adjust operation of a wireless communication system, such as a radio, based on the determined operation parameters. Once adjusted, the wireless communication system may operate with the operation parameters.

One benefit of adjusting the operation of the network device based on characteristics transferred from the identification module is better network device operation. The network device may operate with the ultimate equivalent isotropically radiated power (EIRP) covered by the grant or approved operation. Rather than operating based on a worst case, the operation is tailored to the actual situation. The antenna characteristics define the power to be used.

In one aspect, an antenna identification system configured to identify an antenna used with a network device is provided. The identification system may include an identification module and a module connector. The identification module may be configured to engage with an antenna connector configured to couple the antenna with the network device. The identification module may be configured to include one or more identification characteristics. The module connector may be configured to communicate the one or more identification characteristics from the identification module to the network device. The network device may be operable to adjust operation based on the one or more identification characteristics.

In a second aspect, an antenna system is provided. The antenna system may include a transducer, a processor, and an identification module. The transducer may be operable to transmit and receive wireless signals. The processor may be coupled with the transducer. The processor may be operable to communicate via the transducer. The identification module may be coupled with the processor. The identification module may provide one or more identification characteristics to the processor. The identification characteristics may be associated with operation of the transducer. The processor may be operable to adjust operation based on the identification characteristics.

In a third aspect, a method for adjusting operation of a wireless communication system is provided. The method may include receiving an identification characteristic from an identification module coupled with an antenna connector. The antenna connector may couple an antenna with a network device. An antenna characteristic may be determined based on the received identification characteristic. The antenna characteristic may define an operation parameter of the antenna. The method may also include adjusting operation of the network device or wireless communication system based on the antenna characteristic.

In one example, a high gain antenna is connected to an access point device. An administrator may desire to remove the high gain antenna and connect a low gain antenna. In addition to connecting the low gain antenna, the administrator may couple an antenna identification system with the access point device. Once connected, the antenna identification system may provide antenna characteristics, such as the approved gain value for the low gain antenna, to the access point device. Based on the antenna characteristics, the access point device may adjust operation of the access point device. For example, the output power may be adjusted to correspond with the approved gain value. As a result, the gain used by the access point device is not limited based on the high gain antenna.

FIG. 1 illustrates an antenna system 1000. The antenna system 1000 may include a network device 100, an antenna 200, an antenna connector 300, and an identification system 400. The network device 100 may transmit or receive signals via the antenna 200. The antenna connector 300 may electrically and mechanically couple the network device 100 with the antenna 200. The identification system 400 may be coupled with the network device 100 and/or the antenna connector 300. The identification system 400 may identify the antenna 200. Herein, the phrases "coupled with" or "couple . . . with" may include directly connected to or indirectly connected through one or more intermediate components. Such intermediate components may include hardware and/or software based components. Variations in the arrangement and type of the components may be made. The antenna system 1000 may include additional, different, or fewer components. For example, the identification system 400 may be part of the network device 100 or the antenna 200.

The antenna system 1000 may be used to automatically adjust operation of the network device 100 based on antenna characteristics 240 and/or module characteristics 440. Antenna characteristics include antenna specifications (e.g., an approved gain value of the antenna 200), owner details (e.g., the name of the owner of the antenna 200), authentication information (e.g., user identification and password), or a combination thereof. Antenna characteristics relate to the antenna 200. Module characteristics 440 may include characteristics relating to the identification system 400, such as a resistance value, capacitance value, or other characteristic that may be associated with an antenna characteristic. The module characteristics 440 may be physical characteristics of the identification system 400 or electrical characteristics of the identification system 400.

The antenna system 1000 may communicate with one or more wired communication devices 2000 and/or one or more wireless communication devices 3000. The antenna system 1000 may communicate with wired communication device 2000 using a communication line 2001, such as a wire or cable. The antenna system 1000 may communicate with wireless communication device 3000 using a wireless signal 3001. The wireless signal 3001 may be configured for a wireless personal area network (PAN), a wireless local area network (LAN), or other wireless network. For example, when configured for a wireless LAN, the network device 100 may configure wireless signal 3001 according to the IEEE 802.11 series protocol. As used herein, the phrase "communicate with" may include transmitting or receiving signals, messages, or data. The signals, messages, or data may include text, audio, or video information. The communication devices 2000 and 3000 may be included in the system 1000 or a different system.

The network device 100 may include a wireless communication system 110 and a port 120. The network device 100 may include additional, different, or fewer components. The network device 100 may be an access point device, router, gateway, hub, switch, wireless bridge, network node, printer or other peripheral, or other now known or later developed device that transmits or receives signals through an antenna 200. The network device 100 may provide network services. For example, the network device 100 may route signals, perform code and protocol conversion processes, transmit or receive signals, or perform one or more now known or later developed network services.

The port 120 may be a physical interface between the communication device 2000 and the wireless communication system 110. The port 120 may be used to electrically couple the communication device 2000 with the wireless communication system 110. The port 120 may be connectors that are mechanically and electrically coupled with the communication line 2001. The port 120 may be electrically coupled with the wireless communication system 110, for example, indirectly through a circuit, wire, other connector, or a combination thereof. FIG. 1 shows a single port 120. However, in alternative embodiments, the network device 100 may include a plurality of ports 120, for example, when the network device 100 is a switch.

The wireless communication system 110 may be a radio communication system, radio, transceiver, network communication system, microwave communication system, any now known or later developed system for transmitting and/or receiving signals, or any combination thereof. For example, in the embodiment of FIG. 1, the wireless communication system 110 is a combination of a radio communication system operative to communicate using radio waves and a network communication system that provides networking services, such as routing and/or switching.

The wireless communication system 110 may be operable to communicate with the antenna 200. The wireless communication system 110 may communicate with the antenna 200 via a communication path 302 of the antenna connector 300. The communication path 302 may be a signal path, conductive channel, wire, cable, connector, series of connectors, line, circuit, or a combination thereof. As will be discussed below, the communication path 302 may be dedicated to communication between the antenna 200 and the wireless communication system 110.

The wireless communication system 110 may include a module communicator 112, a processor 114, and a memory 116. Additional, different, or fewer components may be provided. For example, the acts performed by the module communicator 112 may be performed by the processor 114. Accordingly, the module communicator 112 may not be included in the wireless communication system 110.

The module communicator 112 may be operable to communicate with the identification system 400 using a communication path 111. The module communicator 112 may communicate with the identification system 400 and the processor 114. Examples of the module communicator 112 may include a processor, a resistance bridge, an application specific integrated circuit, or other now known or later developed device.

In one embodiment, the module communicator 112 is a processor operable to read information from a memory disposed in the identification system 400. The module communicator 112 may operate as, in parallel to, or in combination with the processor 114. For example, as will be discussed below, the processor 114 may access information stored on the identification system 400. In this example, the processor 114 operates as the module communicator 112 and the module communicator 112 may not be provided. In another example, the module communicator 112 is a processor and operates in parallel to or in conjunction with the processor 114.

In another embodiment, the module communicator 112 is a circuit that determines a module characteristic of the identification system 400. One exemplary circuit is a resistance bridge circuit. The resistance bridge circuit is operable to determine a resistance value associated with the identification system 400. The resistance bridge circuit may be designed to read the resistance of the identification system 400. Another exemplary circuit is a voltage divider circuit using an on-board resistor. The resultant voltage across this on-board resistor may be sampled with an analog-to-digital converter. The result indicates the resistance of the identification system 400. The module communicator 112 may use an analog-to-digital converter in the processor 114, for example.

The module communicator 112 may obtain antenna characteristics 240 and/or module characteristics 440 from the identification system 400 using the communication path 111. The communication path 111 may be independent or separate from communication path 302.

The processor 114 may communicate with the identification system 400 using the communication path 111. The processor 114 may be operative to access or communicate with the memory 336 (shown in FIG. 5 and discussed below) of the identification system 400 to determine one or more antenna characteristics 240 and/or module characteristics 440.

In one embodiment, the processor 114 is operative to obtain one or more antenna characteristics 240 directly from the memory of the identification system 400. The processor 114 may read, measure, request, or otherwise obtain the one or more antenna characteristics directly from the memory 336 via the communication path 111. As discussed above, antenna characteristics include antenna specifications (e.g., model number, serial number, or an approved gain value of the antenna 200), owner details (e.g., the name of the owner of the antenna 200), authentication information (e.g., user identification and password), or a combination thereof.

In another embodiment, the processor 114 and/or module communicator 112 are operable to obtain a module characteristic 440 from the identification system 400 via the communication path 302, and the processor 114 may be operable to determine an antenna characteristic 240 based on the module characteristic 440. As used herein, the term "based on" may include as a function of, dependent on, associated with, or related to.

To determine the antenna characteristic 440, the processor 114 may use an antenna characteristic output from the module 400. Alternatively, the processor 114 associates the module characteristic 440 with an antenna characteristic 240 stored in memory 116. For example, the module characteristic 440 may be mapped to an antenna characteristic 240. Table 1 illustrates one example of module characteristics 440 associated with (or mapped to) an antenna characteristic 240. The approved gain value may be a gain value approved by the Federal Communication Commission for the antenna 200 or some other regulatory body.

TABLE 1

Associating a Module Characteristic with an Antenna Characteristic

| Module Characteristic 440 [Resistance of Identification system 400] | Antenna Characteristic 240 [Approved Gain Value for Antenna 200] |
|---|---|
| 25 ohms | 1 dbi |
| 50 ohms | 2 dbi |
| 75 ohms | 4 dbi |
| 100 ohms | 6 dbi |

As shown in Table 1, a module characteristic 440, such as the resistance value of the identification system 400, may be associated with an antenna characteristic 240, such as the approved gain value of the antenna 200. Table 1 associates 25 ohms of resistance with 1 dbi of gain. Table 1 is for exemplary purposes only. Associations may be stored in memory 116 or memory 336. Alternatively, the processor 114 may derive associations. Other associations and antenna characteristics may be used. For example, module characteristics 440 may be associated with owner details or authentication information.

The processor 114 is operable to determine an operation parameter of the network device 100 based on the antenna characteristic 240. The operation parameter may define operation of the network device 100. Exemplary operation parameters include output power, operating frequency, or other operation parameters for the network device 100. For example, the processor 114 may determine a maximum output power for an approved gain value. The operation parameter may be obtained from memory 116, obtained from the identification system 400, calculated based on an antenna characteristic 240 or module characteristic 440, or a combination thereof.

The processor 114 may adjust operation of the network device 100 based on the determined operation parameter. Adjusting operation of the network device 100 may include adjusting operation parameters to be the same as or in accordance with the determined operation parameters. For example, the processor 114 may adjust the output power of the antenna 200 based on the gain of the antenna 200. The output power, given the gain of the antenna, may not exceed an output power limit. The operation of the wireless communication system 110 may be adjusted to be closer to without exceeding the limit.

Operation of the network device 100 may be adjusted by coupling an identification system 400 associated with the antenna 200 to the network device 100. For example, a network administrator may decide to replace a first antenna 200 with a second antenna 200. The second antenna 200 may have different operation parameters than the first antenna 200. The network administrator may remove the first antenna 200 from the network device 100, for example, by disconnecting the first antenna 200 from the antenna connector 300. The second antenna 200 may be coupled with the network device 100. An identification system 400 may be coupled with the network device 100. The identification system 400 measures a characteristic of any connected antenna 200. Alternatively, replacement of the first antenna 200 also replaces the identification system 400. The network device 100 may automatically adjust operation of the network device 100 to compensate for the difference in operation parameters based on characteristics associated with or stored on the identification system 400.

In one embodiment, the processor 114 is operable to notify a user that an incorrect antenna 200 has been used or that the antenna 200 has been removed, disconnected, or tampered with. Notification may include providing, triggering, or operating a textual, graphical, or audio alarm. For example, the network device 100 may transmit an operation error to the communication device 2000. The operation error may indicate that the antenna 200 does not correspond to the identification system 400. In another example, when the antenna 200 is removed from the antenna connector 300, the processor 114 is operable to trigger an audio alarm, such as a beeping noise, to notify the user that the antenna 200 has been removed.

The memory 116 is operable to store information. Information may include associations between antenna characteristics 240 and module characteristics 440, adjusting information, information relating to the network device 100, or other system 1000 related information. For example, the memory

116 may store information relating to Table 1 or a similar table. In another example, the memory 116 stores the antenna characteristics 240 and/or module characteristics 440.

The memory 116 may store instructions that may be executed by the processor 114. The memory 116 may store instructions for obtaining characteristics 130, instructions for determining antenna characteristics 132, instructions for determining operation parameters 134, and instructions for adjusting operation of the wireless communication system 136. The instructions for obtaining characteristics 130 may be executed to obtain antenna characteristics 240 and/or module characteristics 440. Obtaining characteristics may include reading from memory 116 or 436, requesting one or more characteristics from the identification system 400 and receiving the requested characteristics, or receiving characteristics from the module communicator 112. The instructions for determining antenna characteristics 132 may be executed to determine antenna characteristics 240 based on module characteristics 440. Determining antenna characteristics may include associating antenna characteristics with module characteristics. The instructions for determining operation parameters 134 may be executed to determine operation parameters of the antenna 200 based on one or more antenna characteristics 240. The instructions for adjusting operation of the antenna 136 may be executed to adjust operation of the wireless communication system based on the one or more determined operation parameters.

The antenna 200 may be a transducer designed to transmit and/or receive electromagnetic waves. The antenna 200 may convert electromagnetic waves into electrical currents and/or electrical currents into electromagnetic waves. The antenna 200 may be used in systems such as radio and television broadcasting, point-to-point radio communication, and wired or wireless networks. The antenna 200 may be directional, semi-directional, or omni-directional. The antenna 200 may also be a linearly, elliptically, or circularly polarized. FIG. 1 illustrates a dipole antenna. Alternatively, any now known or later developed antenna, such as a monopole or patch antenna, may be used.

The antenna 200 may be associated with one or more antenna characteristics 240. Antenna characteristics 240 may identify, tell apart, distinguish, authenticate, and/or describe recognizably the antenna 200. An antenna characteristic 240 may be a distinguishing mark or trait. Antenna characteristics may include operation parameters, owner details, authentication information, a combination thereof, or any information relating to the antenna. Operation parameters may include the resonant frequency, operating gain, radiation pattern, impedance, efficiency, bandwidth, and/or polarization of the antenna 200. Owner details may include information relating to an owner of the network device 100, the network device 100, or the antenna 200, such as serial number, date of manufacture, country of origin or other details. Authentication information may include a user identification (ID) and password that may be used to authenticate or authorize the antenna 200 for communicating (e.g., transmitting or receiving signals, messages, or data) with the network device 100.

The antenna connector 300 may be coupled with the network device 100 and/or antenna 200. For example, the antenna connector 300 may engage with or be part of the network device 100 and the antenna 200 may engage with the antenna connector 300. As used herein, the phrase "engage with" may include brought together and interlocked. Interlocked may include connected so that the motion or operation of a part is constrained by another part and may also include connected to allow motion. The network device 100 may engage with the antenna 200 through the antenna connector 300. The antenna 200 may be secured, fixed, or attached (e.g., with or without being able to move) to the network device 100.

The antenna connector 300 may electrically couple the network device 100 with the antenna 200 and/or identification system 400. The antenna connector 300 includes a communication path 302 that electrically couples the wireless communication system 110 of the network device 100 with the antenna 200. The antenna connector 300 may also include a communication path 111 that electrically couples the wireless communication system 110 with the identification system 400. For example, the module communicator 112 or processor 114 may be coupled with the identification system 400 via the communication path 111. The communication path 111 may be independent of the communication path 302. One benefit of having independent communication paths from the antenna 200 and identification system 400 to the wireless communication system 110 is that interference in signaling may be reduced or eliminated.

The antenna connector 300 may be structurally coupled with the network device 100 and/or the antenna 200. In one embodiment, the antenna connector 300 is a snap-in device that is operable to be snap connect with the network device 100. In another embodiment, the antenna connector 300 may include mounting openings for mounting the antenna connector 300 to the network device 100. A securing bolt may be inserted through mounting openings and aligned with openings in the network device 100. Once inserted through the openings in the network device 100, a securing nut may be attached to the securing bolt on the inside of the network device 100. One example of the antenna connector 300 is a reverse polarity-threaded Neill Concelman (RP-TNC) connector. Alternatively, or additionally, glue, pins, threading, or other connectors may be used to mount the antenna connector 300 to the network device 100.

The antenna 200 may engage with the antenna connector 300 via an antenna coupling. The antenna coupling 330 may be threading, snap-fit connector, push on connector, or other type of connector sized to receive and engage with the antenna 200. As a result, engaging with the antenna connector 300 may include being plugged into, being snapped into, being threaded into, or otherwise connected with the antenna connector 300. For example, in one embodiment, the antenna 200 may be screwed onto the antenna coupling. Alternatively, the antenna 200 may be pushed or snapped on onto the antenna coupling. The antenna 200 may engage with the antenna connector 300 before or after the antenna connector 300 is structurally coupled with the network device 100.

The identification system 400 may be an identifying antenna module, identification connector, self-identifying module, or other physical device for identification of the antenna 200. The identification system 400 may be used to identify or provide one or more antenna characteristics 240 and/or module characteristics 440. In order to identify or provide the characteristics, the identification system 400 may be manufactured, programmed, or provided with one or more antenna characteristics 240 and/or module characteristics 440. For example, in one embodiment, the identification system 400 is manufactured with a material that has an associated resistance, impedance, and/or capacitance. In another example, the identification system 400 is programmed to include one or more antenna characteristics 240.

Figure 2:
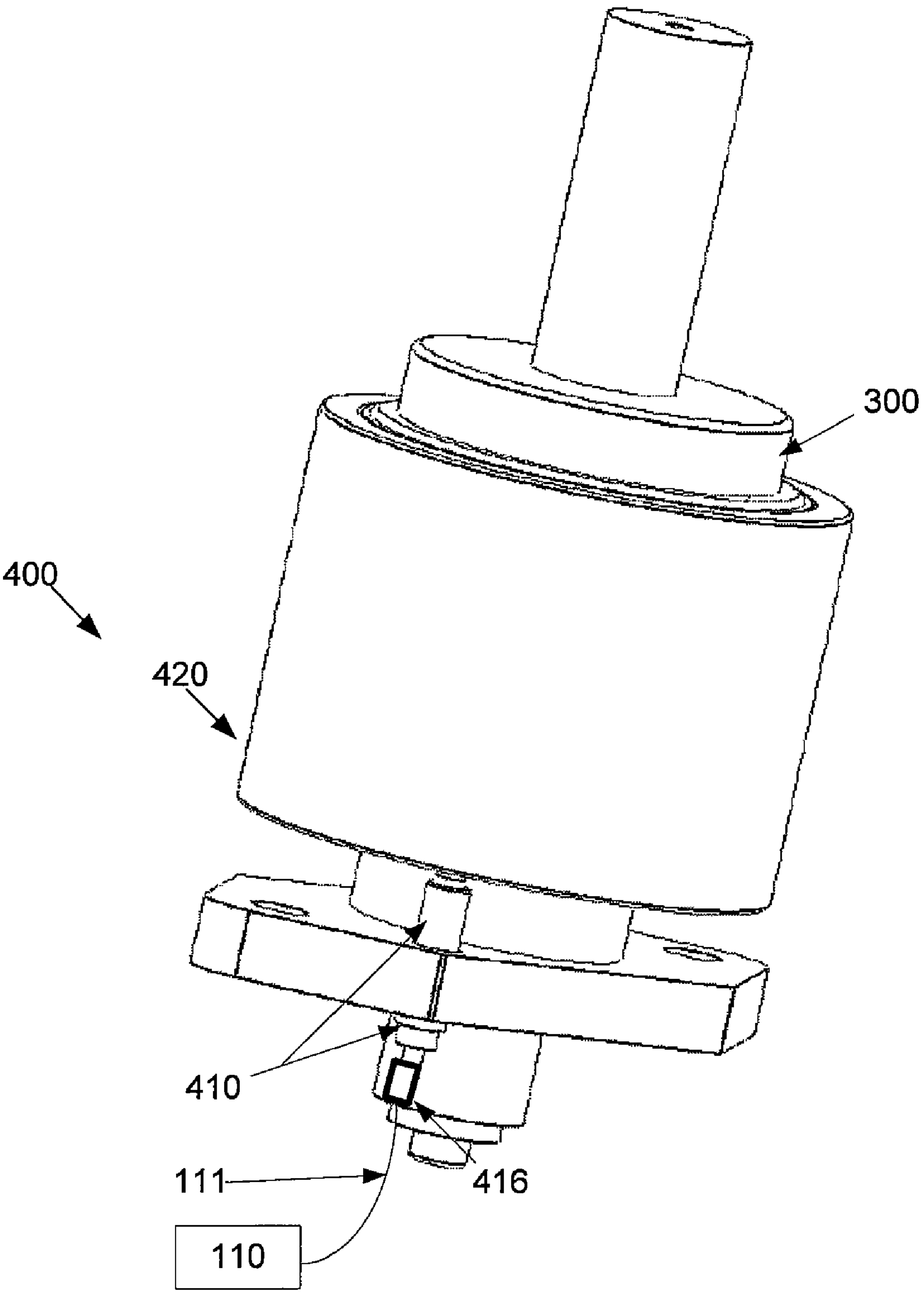
FIG. 2 illustrates one embodiment of an identification module coupled with an antenna connector.

As shown in FIG. 2, the identification system 400 includes one or more module connectors 410 and an identification module 420. The identification system 400 may include additional, different, or fewer components. For example, the identification system 400 may include a covering. The covering may be a protective layer, heat shrink wrap, insulation covering, tape, or non-conductive epoxy. The protective layer may be disposed around all, some, or none of the one or more connectors 410. The protective layer may prevent the one or more module connectors 410 from electrically contacting components that may cause interference in identifying the antenna 100. In another example, the one or more module connectors 410 may be integrated with the identification module 420, for example, as molded prongs that extend from the identification module 420.

The one or more module connectors 410 may be pins, contacts, clips, or other devices that electrically couple the identification module 420 with the wireless communication system 110. In one embodiment, as shown in FIG. 2, the module connector 410 may be a spring-loaded pin. The spring-loaded pin may include a first end and a second end. The first end may be disposed outside of the network device 100 and the second end may be disposed inside of the network device 100. In other words, the module connector 410 may extend through a network device covering. The first end may engage and communicate with components in the identification module 420. The second end may be coupled with the communication path 111 via an input/output connector 416 that may engage with the second end. The first end 412 may be electrically coupled with the second end 414. Accordingly, the identification module 420 may communicate with the wireless communication system 110 of the network device 100.

Figure 3:
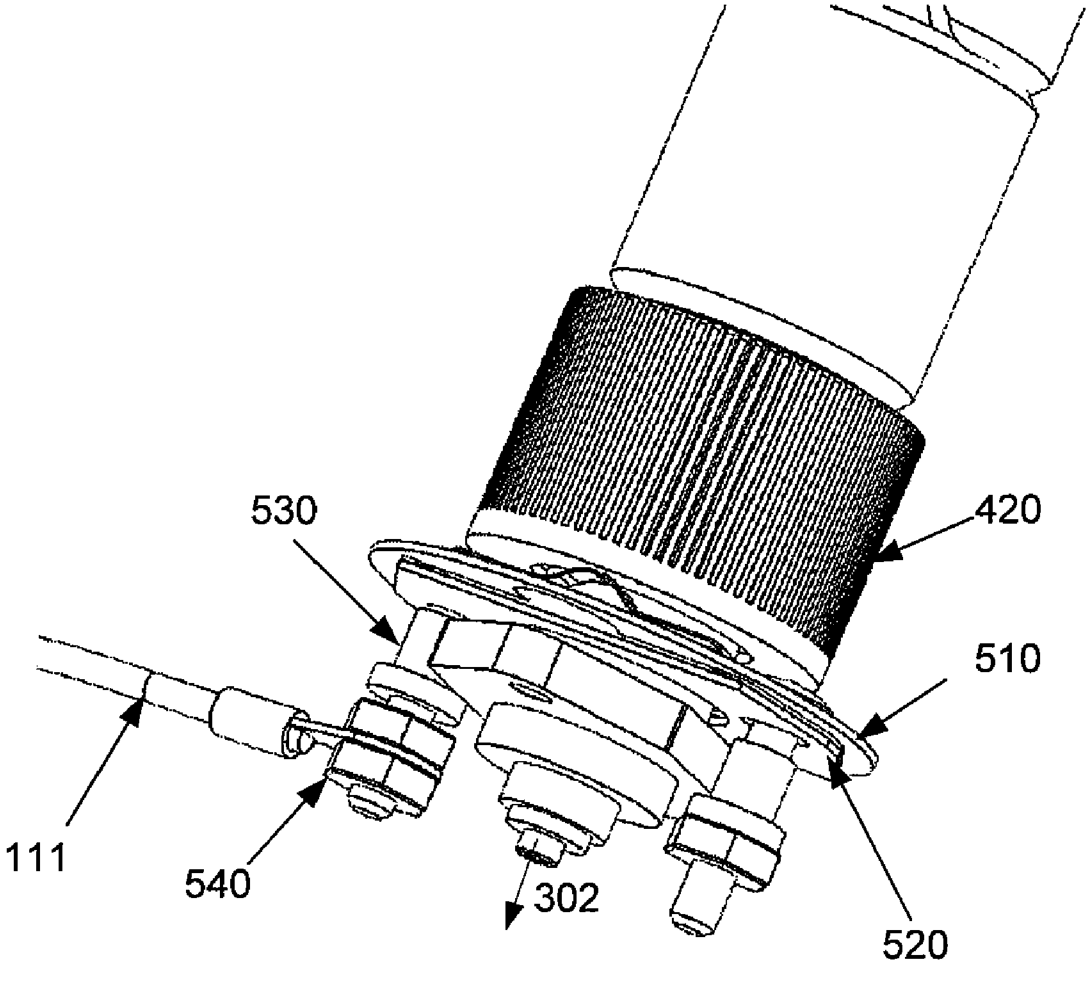
FIG. 3 illustrates another embodiment of an identification module.
Figure 5:
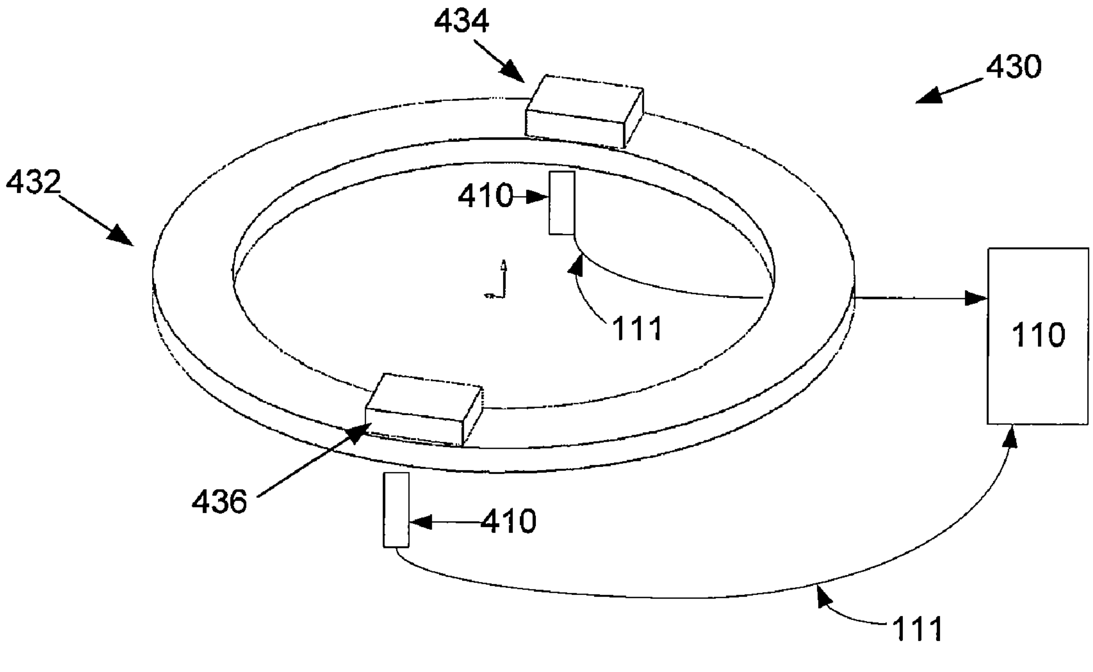
FIG. 5 illustrates one embodiment of the module circuit.

In another embodiment, as shown in FIG. 3, the module connector 410 may be a clip. As shown in FIG. 3, the clip may include a module contact 510, an insulator 520, a bolt 530, and a lug/nut 540. Additional, different, or fewer components may be provided. The module connector 410, as shown in FIG. 5, may be used to electrically couple the module circuit 430 (as discussed below) with the wireless communication system 110. An insulator 520 and module contact 510 (e.g., a formed metal clip) may be slipped over the antenna connector 300 on the antenna side of the network device 100 and screwed to the network device housing to prevent an accidental connection between the module contact 510 and the mounting surface. The bolt 530 may be used as the connection point for the communication path 111 (e.g., one-wire). The bolt 530 may electrically couple the module contact 510 with the communication path 111. The insulator 520 may insulate the bolt 530. The attachment is made with a simple (cheap, standard) spade lug 540 or similar product. One benefit of using the bolt 530 is that the antenna connector 300 does not need to be changed to accommodate the module connector 410. Additionally, the cost of the bolt 530/nut 540 combination is relatively lower than a custom antenna connector 300. A ground trace may be provided through the antenna connector 300. The insulator 520 may be slipped over the existing antenna connector 300 on the antenna side. This insulator may be a non-metallic piece that isolates the module contact 510 from a metal network device 100 housing. The module contact 510 is screwed down (through the insulator 520) to the network device 100. The bolt 530 may become the connection point to the module contact 510. In an alternative embodiment, there may be two bolts 530 to hold down the module contact 510 and the insulator 520. A nut 540 may be attached to the bolt to complete the circuit. This type of wire/connection scheme is extremely simple, cheap and commonly available from many sources. One benefit of using a module contact 510 to electrically couple the identification module 420 to the wireless communication system 110 is that the module contact 410 is a low-cost connector that may ensure electrical connectivity.

Although FIGS. 2 and 3 show a single communication path 111 extending from the module connector 410, alternative embodiments may include a plurality of communication paths 111 to electrically couple the wireless communication system 110 with the identification module 420. The plurality of communication lines 111 may be used to transmit or receive the same or different information. For example, a first communication path 111 may be used to communicate operation parameters from the identification module 420 to the wireless communication system 100. A second communication path 111 may be used to provide power to the identification module 420. Alternatively, a first identification module may be used to communicate the operation parameters and the authentication information.

The identification module 420 may be designed, manufactured, programmed, or otherwise configured to identify the antenna 200. Identifying the antenna 200 may include providing one or more antenna characteristics 240, one or more module characteristics 440, or a combination thereof to the wireless communication system 110. Providing may include providing access to, responding to a request for, or transmitting as a rule. For example, an antenna characteristic 240 may be transmitted once a day, upon disconnect, or upon setup initiation.

In one embodiment, the identification module 420 includes a resistance ring. The resistance ring is a housing having a programmed resistance. The resistance ring may be affixed to the antenna connector 300. The resistance ring may be a nonconductive body (e.g., plastic or ceramic). The resistance ring may be press-fitted, glued, or otherwise attached to the antenna connector 300. The resistance ring may be conductive elastomer, thick film resistor, or similar material. The resistance of the ring may be mapped to a gain figure of the antenna 200.

The resistance value of the identification module 420 may vary depending on the shape, size, and/or material of the identification module 420. For example, a thicker identification module 420 may have a greater resistance value than a thinner identification module 420. The shape of the identification module 420 may also be varied. For example, a square identification module 420 may have a greater resistance value than a circular identification module 420.

Figure 4:
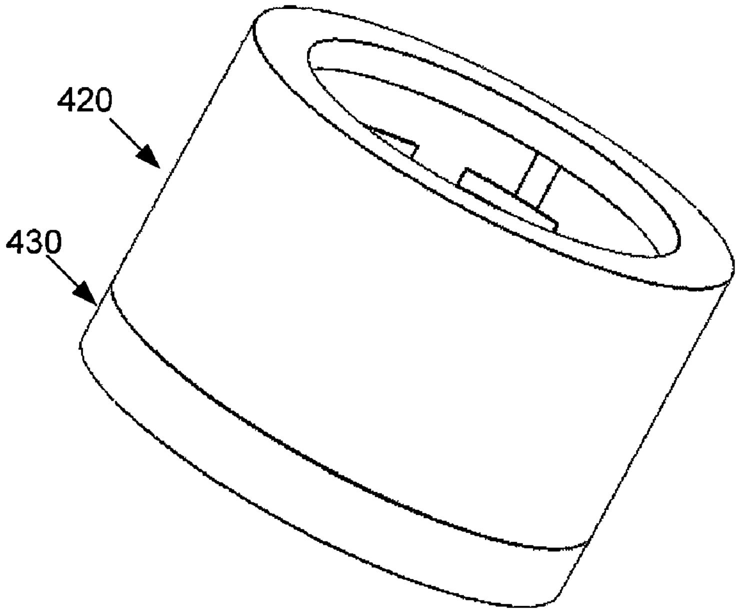
FIG. 4 illustrates an identification module having an identification housing coupled with an module circuit, according to one embodiment.

In another embodiment, as shown in FIG. 4, the identification module 420 may include or be coupled with a module circuit 430. The identification module 420 may be structurally coupled with the module circuit 430. The identification module 420 and the module circuit 430 may be sized and shaped to engage with the antenna connector 300. For example, the identification module 420 and the module circuit 430 may have openings that are sized to be snug fit with the antenna connector 300. In another example, identification module 420 and the module circuit 430 may include a snap-fit connector that snaps to the antenna connector 300. In yet another example, the identification module 420 and the module circuit 430 may include openings that allow the identification system 400 to be placed over the antenna connector 300. The identification system 400 may include additional openings, connectors, or attachments for securing the identification system 400, for example, bolts, glue, epoxy, snap-fit connectors, or other attachments may be used.

As shown in FIG. 5, the module circuit 430 may include a circuit board 432, processor 434, and a memory 436. Additional, different, or fewer components may be provided. For example, in one embodiment, the module circuit 430 may include a memory 436 and not a processor 434. The memory 436 may be a computer readable storage medium, an electrically erasable programmable read-only memory (EEPROM)

or other tangible storage medium. For example, the EEPROM may store antenna characteristics 240 and/or module characteristics 440. The memory 436 may be electrically coupled with a module connector 410, for example, with one or more pads and vias located on, in, above, below, or through the circuit board 432.

The circuit board 432 may be a single or double sided circuit board. The inside diameter of the circuit board 432 may be sized to fit around the antenna connector 300. The top surface of the circuit board 432 may be a ground plane with the exception of a contact pad and vias to the bottom surface. The bottom surface of the circuit board 432 may be the contact surface for the one or more module connectors 410.

The processor 434 and/or the memory 436 may communicate with the wireless communication system 110 using one or more module connectors 410. For example, a first module connector 410 may provide power to the module circuit 430 from the wireless communication device 110. The processor 434 and memory 436 may be electrically coupled together, for example, using a trace on the circuit board 432 or a wire. The processor 434 may obtain antenna characteristics 240 and/or module characteristics 440 from the memory 436. The obtained characteristics may be provided to the wireless communication system 110 through a second module connector 410. In an alternative embodiment, a power source may be included in the module circuit 430 and disposed on the circuit board 432. The memory 436 may be a storage device, passive component, identification device, or silicon one-wire memory device, such as an EEPROM. The memory 436 may store antenna characteristics 240 and/or module characteristics 440. The information stored in the memory 436 may be accessed by the processor 434 or the wireless communication system 110.

In one embodiment, the memory 436, communication path 111, and wireless communication system 110 may operate as a one (1)-wire system. In this embodiment, the processor 434 may not be provided. One-wire devices are designed for relatively slow, serial communications across a single wire. They derive power from the line during the time that the line is pulled-up. The host initiates and controls the serial transfer of data. Typical data rates are 15.3 kbits per second or 125 kbits per second. The device is addressed (read or write) with a strict protocol but all the data goes over one wire (with a ground return). All the desired information is stored on a single chip with no power supply required and also something that is electrostatic sensitive. The 1-wire protocol is simple to implement from a hardware and software standpoint because of the reduced number of components and simplicity of the operating protocol.

One benefit of using a module circuit 430 is that the module circuit 430 allows expansion of the information content beyond antenna specifications, such as an operating gain value of the antenna 200. Additionally, the module circuit 424 may provide unique serialization, gain/pattern information, or manufacturing information. In addition, the reading and writing of this information might be done in a secure way. For example, a security or authentication algorithm may be implemented with a secure EEPROM device.

In one embodiment, the security algorithm may be a secure hash algorithm (SHA), such as SHA-1. SHA-1 is a challenge/response authentication scheme for reading and writing data in a secure way. The SHA-1 algorithm is a mathematically complex computation that uses a mutual authentication scheme for tamper-proof data storage. The SHA-1 is a one-way hash—or non-reversible function. There may be no way to derive any part of the input by looking at the output. SHA-1 is termed “chaotic” because small changes in the challenge create large changes in the response making it almost impossible to decode the secret. SHA-1 is collision resistant. It is impractical to find two challenge messages that produce the same response.

In another embodiment, a slave-to-host authentication is provided. The host processor (e.g., processor 114) has SHA-1 computation capability and has knowledge of a “secret” in the memory 336 (e.g., EEPROM). In this example, the processor 114 is the host and the memory 336 is the slave. The slave to host authentication begins with the host processor issuing a message along with the secret and the EEPROM applies the “Hash” function to this input and computes a “Message Digest” or Media Access Control (MAC) address. The EEPROM then outputs the MAC to the host processor who already knows the SHA-1 input (because it sent it) and the host already knows the “secret.” The host then performs a duplicate SHA-1 computation and compares the result. The host then verifies that this EEPROM is authentic and that the data contained in the EEPROM is valid. In this way, the antenna (with identification system 400) can be verified to be an approved device rather than a counterfeit device, thus adding more security to the information stored within the EEPROM device. Another benefit of the module circuit 424 is that the module circuit 424 may be used to “certify” third party antennas. This technology can be shared with approved suppliers to create authentic technology for use with the network device 100.

The module circuit 424 may be used to expand the functionality of the network device 100. For example, special features may be provided using the identification system 400. This adds sourcing flexibility and minimizes disruption to the catalog antenna line.

The identification system 400 may not be coupled with the communication path 302. Identification of the antenna 200 does not require connecting to, altering, depending on, or relying on the communication path 302 to the antenna 200. As a result, any radio frequency complications and concerns with identification of the antenna 200 may be eliminated or reduced. Alternatively, the identification system 400 connects with the communication path 302.

Figure 6:
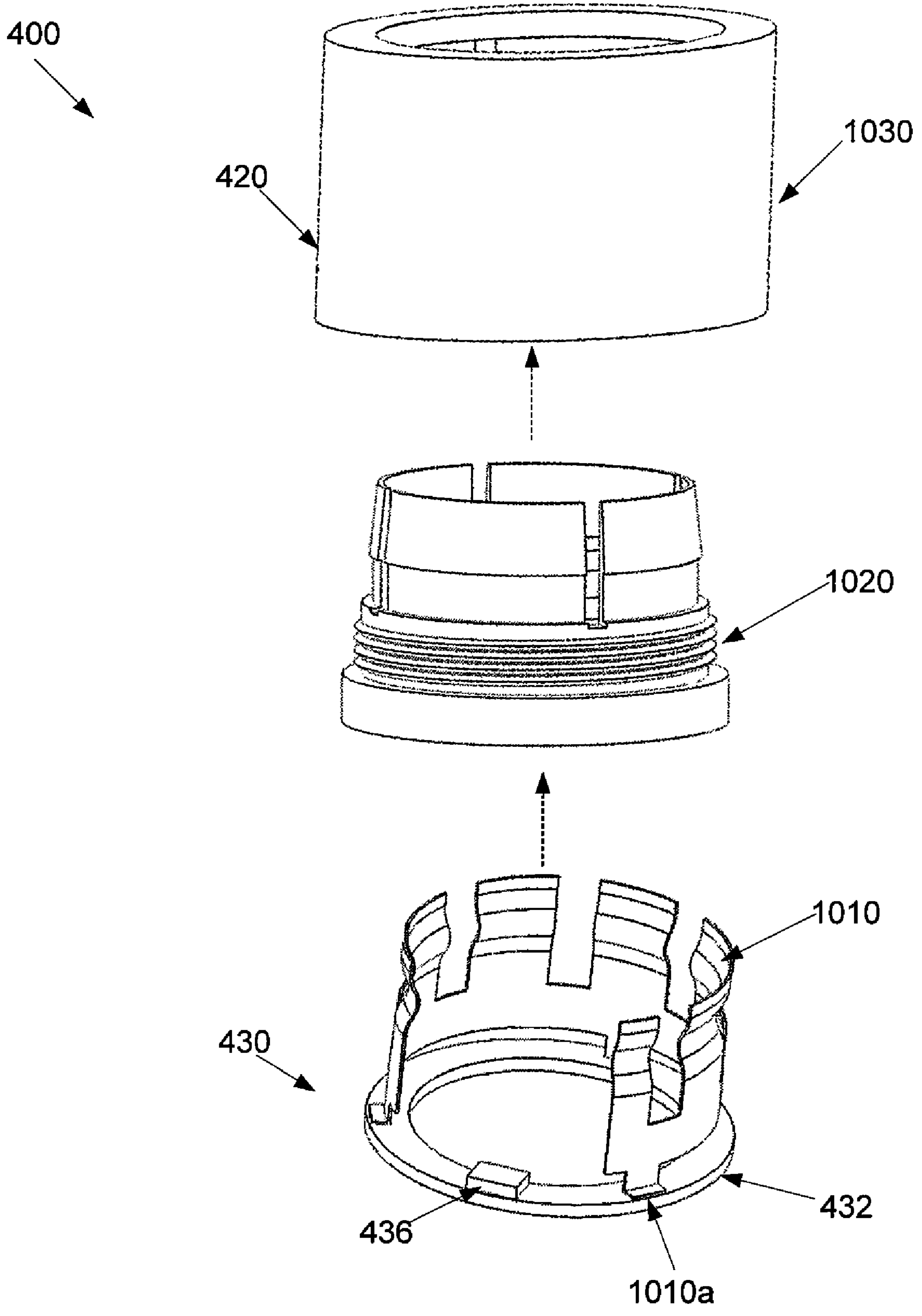
FIG. 6 illustrates an example exploded view of an identification housing.

FIG. 6 illustrates one embodiment of a connection between the module circuit 430 and the identification module 420. FIG. 6 is an exploded illustration of the identification system 400. The components shown in FIG. 6 may be brought together and interlocked, as illustrated with the dotted lines. As shown in FIG. 6, the identification module 420 may include a sleeve 1010, a ferrule 1020, and a cap 1030. The connection may include additional, different, or fewer components. The sleeve 1010 may include solder tabs **1010*a*. The solder tabs 1010*a* may be configured to be soldered to a top surface of the circuit board 432. The sleeve 1010 may be pressed onto the antenna connector 300 to provide a ground connection for the memory 436 and/or processor 434. The sleeve 1010 may be made of brass. The sleeve 1010 may include a cutout for memory 436 and/or processor 434A compression ferrule 1020 may be slipped over the sleeve 1010. The ferrule 1020 may engage with the sleeve 110. The ferrule 1020 may cover one or more of the edges of the circuit board 432 presenting a clean look for the finished module. The ferrule 1020 may be made of plastic. The ferrule 1020 may include threading on a side opposite of the sleeve 110. A cap 1030 may be place over the ferrule 1010. The cap 1030 may be threaded into place on the ferrule 1010. Accordingly, the cap 1030 may include threading on an inner side. The cap 1030 may be locked into place with some adhesive or a set-screw. The identification system 400 may be pressed onto the antenna 200 and/or antenna connector 300. The identification system 400 may be engaged with the antenna connector 300. For example, the identification system 400 may be snug fit with the antenna connector 300**.

The processor 114 and 434 may be general processors, digital signal processors, application specific integrated circuits, field programmable gate arrays, analog circuits, digital circuits, combinations thereof, or other now known or later developed processors. The processors 114 and 434 may be single devices or a combination of devices, such as associated with a network or distributed processing. Any of various processing strategies may be used, such as multi-processing, multi-tasking, parallel processing, or the like. Processing may be local, as opposed to remote. For example, the processor 114 is operable to perform processing completed by the processor 434. The processors 114 and 434 are responsive to instructions stored as part of software, hardware, integrated circuits, firmware, micro-code or the like. For example, the processor 114 and 434 may be operable to execute instructions stored in memory 116 and 436. The processors 114 and 434 are operable to perform one or more of the acts described or illustrated herein.

The memory 116 and 436 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 116 and 436 may be a single device or a combination of devices. The memory 116 and 436 may be adjacent to, part of, networked with and/or remote from the processor 114 and 434.

The memory 116 and 436 may be a computer readable storage media having stored therein data representing instructions executable by the programmed processor 114 and 434. The memory 116 and 436 may store instructions for the processors 114 and 434. The processors 114 and 434 are programmed with and execute the instructions. The functions, acts, methods or tasks illustrated in the figures or described herein are performed by the programmed processors 114 and 434 executing instructions stored in the memory 116 and 436. The functions, acts, methods or tasks are independent of the particular type of instructions set, storage media, processor or processing strategy and may be performed by software, hardware, integrated circuits, firm ware, micro-code and the like, operating alone or in combination. The instructions are for obtaining one or more antenna characteristics and adjusting the operation of the antenna based on the one or more antenna characteristics.

FIG. 7 illustrates one embodiment of a method 700 for adjusting operation of the network device or wireless communication system. The method 700 may be used to adjust the operation of a network device 100 or a wireless communication system 110 in the antenna system 1000 of FIG. 1 or a different system. The acts may be performed in the order shown or a different order. The method 1200 may be performed by a network device. Other devices may also perform the method 1200.

The method 700 may include receiving an identification characteristic from an identification module, as shown in block 710. The identification module may be coupled with an antenna connector. The antenna connector may couple an antenna with a network device. In one example, receiving an identification characteristic may include reading a memory of the identification module to determine an antenna characteristic. In another example, receiving an identification characteristic may include measuring or calculating a module characteristic, such as resistance or capacitance of the identification module.

The identification characteristic may be an antenna characteristic and/or a module characteristic. An antenna characteristic may define one or more characteristics of the antenna, such as antenna specifications, owner details, or authentication information. A module characteristic may define a physical or electrical characteristic of the identification module.

As shown in block 720, an antenna characteristic may be determined based on the received identification characteristic. When the identification characteristic is an antenna characteristic, the identification characteristic may be used as the antenna characteristic. However, when the identification characteristic is a module characteristic defining a physical characteristic of the identification module, determining the antenna characteristic may include associating the module characteristic with an antenna characteristic. Associating may include mapping, calculating, or comparing the module characteristic. For example, the module characteristic may be compared to an association table that associates a module characteristic with an antenna characteristic. In one embodiment, a resistance value of the identification module may be associated with a gain value of the antenna. Other values may be associated Operation of the network device or wireless communication system may be adjusted based on the antenna characteristic, as shown in block 730. For example, when the antenna characteristic is a gain value of the antenna, adjusting operation of the wireless communication device may include adjusting an output power of the antenna. In another example, when the antenna characteristic includes authentication information, the antenna may be authenticated using the authentication information prior to adjusting operation of the network device to operate.

The network device may communicate with an antenna through a first communication line and the identification module through a second communication line. The first communication line may be electrically independent of the second communication line. As a result, the first communication line is free or substantially free of interference from the second communication line. The phrase "substantially free" includes free enough to prevent disruptions during the operation of the antenna.

FIG. 8 illustrates one embodiment of a method 800 for installing an antenna. The method 800 may be used to install an antenna in the antenna system 1000 of FIG. 1 or a different system. The acts may be performed in the order shown or a different order. For example, an identification system may be installed or removed prior to an antenna being installed or removed.

The method 800 may include removing a first antenna from an antenna connector that couples the first antenna with a network device, as shown in block 1310. The first antenna may have a first operation parameter, such as gain or operating power. Uninstalling may include removing, unscrewing, unsnapping, or pulling. At block 820, a first identification system is removed. The first identification system includes an identification characteristic that defines the first operation parameter.

Once the first antenna is uninstalled, a second antenna may be installed with the antenna connector, as shown at block 830. Installing may include attaching, screwing, snapping, pressing, or pushing. The second antenna may have a second operation parameter. The second antenna may be electrically coupled with the network device through a first electrical connection to the network device.

Once the first identification system is uninstalled, a second identification system may be installed with the antenna connector. The first identification system may be uninstalled before, after, or with the antenna. The second identification system may include an identification characteristic that defines a second operation parameter for the second antenna. The second identification system may be electrically coupled with the network device through a second electrical connection to the network device. The first electrical connection may be electrically independent of the second electrical connection, such that the second electrical connection does not interfere with the first electrical connection.

Installing the second identification system may include electrically coupling a module connector with a memory in the second identification system, the module connector being electrically coupled with a wireless communication system of the network device. Electrically coupling the module connector with the memory may include aligning the module connector with a contact pad that is electrically coupled with the memory.

In act 850, operation of the network device is adjusted. Adjustment of the operation of the network device may be based on antenna characteristics and/or module characteristics stored in the second identification system. Act 850 may include associating or mapping a module characteristic to an antenna characteristic. For example, a resistance value of the second identification system may be mapped to a gain value for the second antenna.

In one embodiment, a first antenna and/or a first identification system may not already be installed, for example, when first setting up the network device or when the network device is being manufactured. When a first antenna and/or a first identification system are not already installed, the method 800 may include only installing an antenna and/or an identification system, as discussed in blocks 830 and 840.

Various embodiments described herein can be used alone or in combination with one another. The foregoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. An antenna identification system configured to identify an antenna used with a network device, the identification system comprising:

an identification module configured to engage with an antenna connector configured to couple the antenna with the network device, the identification module configured to include one or more identification characteristics; and a module connector configured to communicate the one or more identification characteristics from the identification module to the network device, the network device being operable to adjust operation based on the one or more identification characteristics.

2. The identification system as claimed in claim 1, wherein the one or more identification characteristics include one or more module characteristics, the one or more module characteristics associated with one or more antenna characteristics.

3. The identification system as claimed in claim 2, wherein the one or more module characteristics define at least one physical characteristic of the identification module, the at least one physical characteristic being a resistance value of the identification module.

4. The identification system as claimed in claim 1, wherein the identification module includes a memory that stores the one or more identification characteristics, the module connector being electrically coupled with the memory and the network device.

5. The identification system as claimed in claim 1, wherein the identification module is sized and shaped to have a module characteristic that may be associated with an antenna characteristic that defines a characteristic of the antenna, the one or more identification characteristics including the module characteristic.

6. The identification system as claimed in claim 1, wherein the identification module includes a module circuit that is coupled with the network device via the module connector, the module circuit including an EEPROM that stores an antenna characteristic, the module circuit configured to provide the antenna characteristic to the network device.

7. The identification system as claimed in claim 1, wherein the module connector is configured as a clip or spring loaded pin.

8. An antenna system comprising:

a transducer operable to transmit and receive wireless signals;

a processor coupled with the transducer, the processor operable to communicate via the transducer; and an identification module coupled with the processor, the identification module providing one or more identification characteristics to the processor, the identification characteristics associated with operation of the transducer, wherein the processor is operable to adjust operation based on the identification characteristics.

9. The antenna system as claimed in claim 8, wherein the identification characteristics include at least one module characteristic that defines a physical property of the identification module.

10. The antenna system as claimed in claim 9, wherein the at least one module characteristic includes a resistance value of the identification module.

11. The antenna system as claimed in claim 8, wherein the identification module includes a computer readable memory, the processor being operable to read the computer readable memory to determine the one or more characteristics.

12. The antenna system as claimed in claim 8, wherein the identification module includes a computer readable memory, the processor being operable to read the computer readable memory to determine authentication information and authenticate the transducer before operation of the transducer.

13. The antenna system as claimed in claim 12, wherein the computer readable memory is an electrically erasable programmable read-only memory.

14. A method for adjusting operation of a wireless communication system, the method comprising:

receiving an identification characteristic from an identification module coupled with an antenna connector, the antenna connector coupling an antenna with a network device;

determining an antenna characteristic based on the received identification characteristic, the antenna characteristic defining an operation parameter of the antenna; and adjusting operation of the network device or the wireless communication system based on the antenna characteristic.

15. The method as claimed in claim 14, wherein receiving the identification characteristic includes reading a memory of the identification module to determine the antenna characteristic.

16. The method as claimed in claim 15, where the antenna characteristic is a gain value of the antenna and adjusting operation of the network device or the wireless communication system includes adjusting an output power to the antenna.

17. The method as claimed in claim 15, where the antenna characteristic includes authentication information, the method further comprising:

authenticating the antenna using the authentication information prior to adjusting operation of the network device or the wireless communication system.

18. The method as claimed in claim 14, where the identification characteristic is a module characteristic defining a physical characteristic of the identification module and determining an antenna characteristic includes associating the module characteristic with the antenna characteristic.

19. The method as claimed in claim 18, where the module characteristic is a resistance value of the identification module and the antenna characteristic is a gain value of the antenna.

20. The method as claimed in claim 14, further comprising communicating with the antenna through a first communication line that is electrically independent of a second communication line used for communicating with the identification module, the first communication line being substantially free of interference from the second communication line.

* * * * *